Dec. 4, 1956  D. G. SALFER  2,772,585
POWER DRILL ATTACHMENT
Filed April 30, 1954  2 Sheets-Sheet 1

INVENTOR.
Donald G. Salfer
BY
McMorrow, Berman + Davidson
ATTORNEYS

Dec. 4, 1956 D. G. SALFER 2,772,585
POWER DRILL ATTACHMENT
Filed April 30, 1954 2 Sheets-Sheet 2
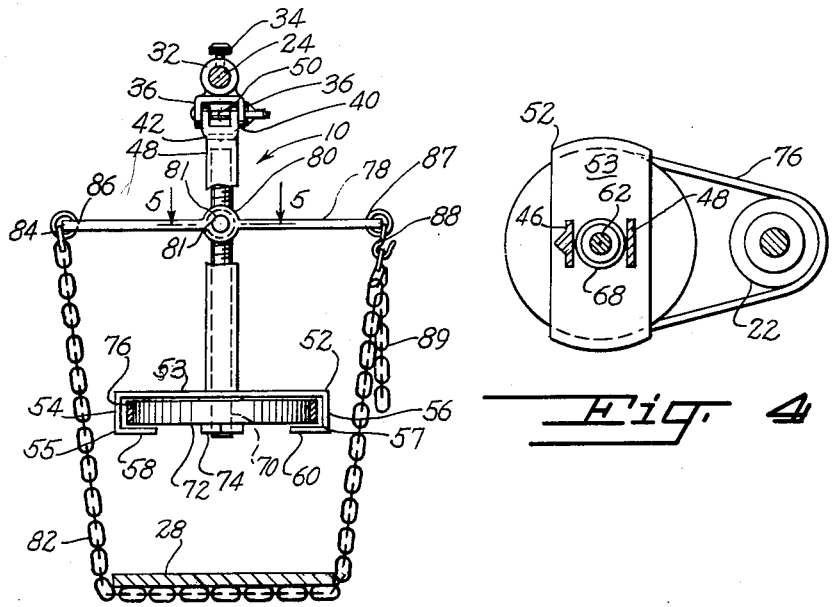
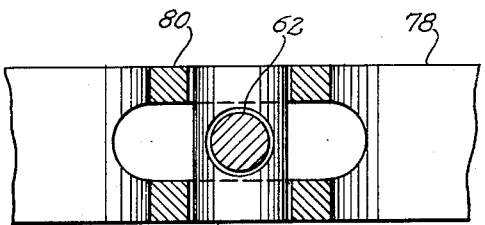
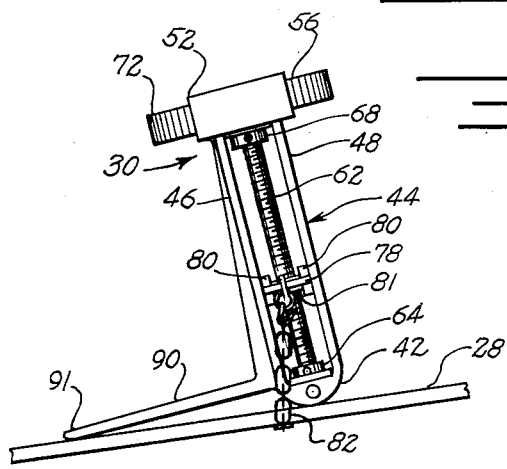
INVENTOR.
Donald G. Salfer

United States Patent Office 2,772,585
Patented Dec. 4, 1956

2,772,585

POWER DRILL ATTACHMENT

Donald G. Salfer, Wabasso, Minn.

Application April 30, 1954, Serial No. 426,652

4 Claims. (Cl. 77—14)

This invention relates to power drills of the portable type, and more particularly to an attachment for such power drills to assist in feeding the drill into a workpiece.

It is the primary object of this invention to provide an attachment for a portable type power drill which may be readily secured thereto and to a workpiece in which the drill is to be fed, and which will assist the drill in feeding into the workpiece to thereby eliminate the necessity of exerting excessive manual pressure upon the drill to feed the drill through the workpiece.

A further object of this invention is to provide an attachment for a power drill which utilizes the rotary motion of the power drill to force the drill to feed into the workpiece.

It is yet another object of this invention to provide an attachment for a power drill which may utilize the rotary motion of the power drill to reset the attachment for further feeding of the drill into a workpiece.

Another and still further object of this invention is to provide an attachment for a power drill which is of relatively simple yet rugged construction, capable of adjustment to fit varying conditions and of universal application to all makes of power driven drills having a steadying handle.

Other objects and advantages will become apparent from a consideration of the following detailed description, forming the specification, and taken in conjunction with the accompanying drawings, in which:

Figure 3 is a side elevational view looking in the direction of the arrows along line 3—3 of Figure 1;

Figure 4 is a horizontal cross sectional view taken along line 4—4 of Figure 1 and looking in the direction of the arrows;

Figure 5 is a cross sectional view taken on line 5—5 of Figure 3; and

Figure 6 is a side elevational view of the attachment per se employed as a clamp without regard to its attachment to a power drill.

Figure 1:
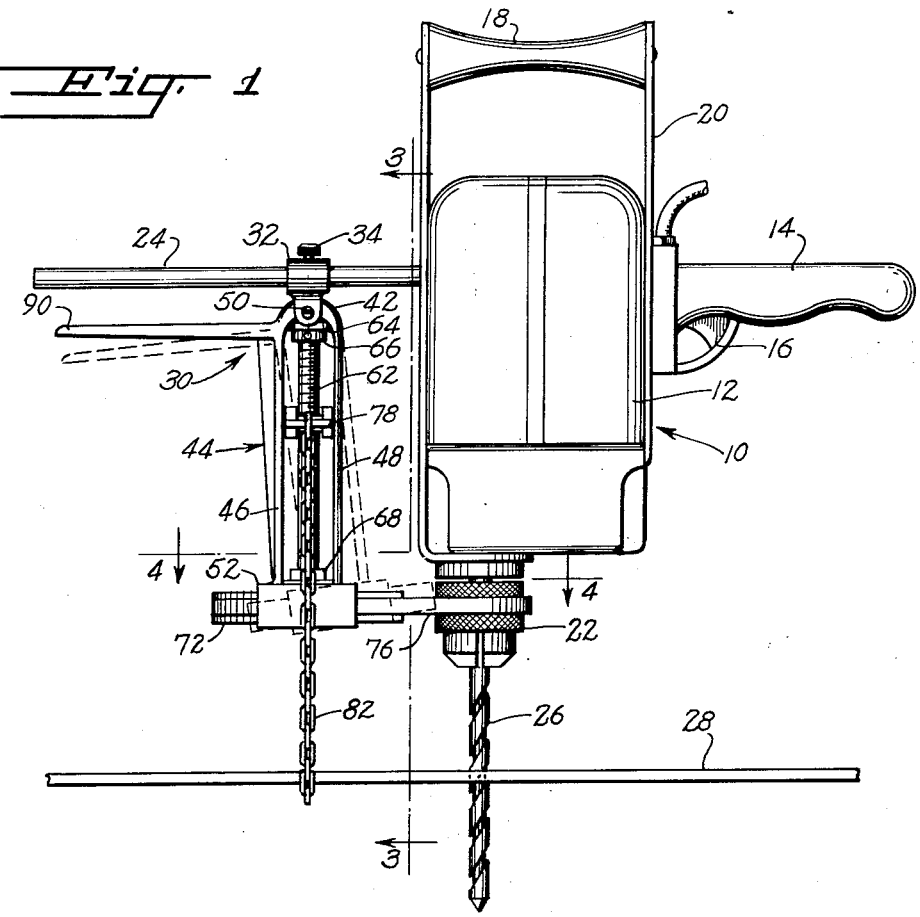
Figure 1 is a side elevational view of an attachment embodying this invention as applied to a power drill and in relation to a workpiece into which the drill is to be fed.
Figure 2:
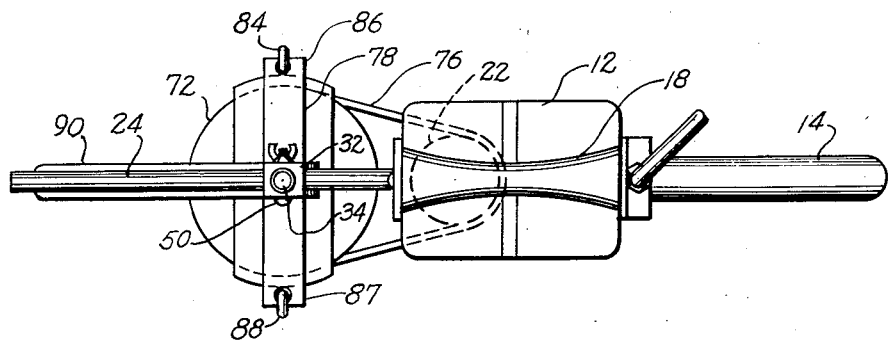
Figure 2 is a top plan view.

With continued reference to the drawings, there is shown a portable electric power drill, generally indicated at 10, of the conventional type and which includes a body 12, a pistol-grip type handle 14 having an actuating switch lever 16 and extending from one side of the body 12. A bracket-type handle 20 extends longitudinally of the body 12 and has the handle portion 18 disposed at one end of the body remote from the end thereof from which the rotatable chuck 22 extends, and in spaced relation thereto. Also, the drill 10 is provided with a steadying handle 24 extending outwardly from the side of the body 12 remote from the side from which the pistol-type handle 14 extends.

As shown in Figure 1, there is a drill 26 secured in the chuck 22 for rotation therewith and shown as having been fed through a workpiece 28.

The attachment, generally indicated at 30, of this invention is carried by the steadying handle 24 of the drill 10 so as to depend therefrom in spaced relation to the body 12 of the drill. Specifically, a collar 32 receives the handle 24 in the bore thereof so that the collar is movable longitudinally of the steadying handle 24 and may be placed in adjusted position at a selected point along the steadying handle 24 and secured at the selected point by a set screw 34 carried by the collar 32 which engages the shaft 24. A pair of spaced parallel ears or lugs 36 and 38 are carried by the collar 32 and depend therefrom to receive therebetween the upper bifurcated end 40 of a U-shaped bracket, the bifurcation 40 forming a portion of the bight 42 of the U-shaped bracket, generally indicated 44. The legs 46 and 48 depend from the bight portion 42 in spaced parallel relation. The bifurcated end 40 which is received between the ears or lugs 36 and 38 is pivotally mounted therein by a pin or screw 50 passing transversely through aligned openings in the respective ears 36 and 38 and registering openings in the bifurcations of the end 40 so that the bracket 44 is carried by the steadying handle 24 for movement in an arcuate path toward and away from the body 12 of the power drill.

The free ends of the bracket legs 46 and 48 remote from the bight portion 42 has secured thereto a plate-like shield 52 which extends therebetween and outwardly therefrom to opposite sides thereof. The shield 52 may be secured to the free ends of the legs 46 and 48 as by being welded or brazed thereto. The free ends of the laterally extending portion 53 of the shield 52 are bent downwardly to define depending flanges 54 and 56 respectively, and the free ends of the depending flanges 54 and 56 are bent laterally in a return direction so as to lie generally in spaced parallel relation to the portion 53 to define short inturned ends 58 and 60 respectively.

A screw shaft 62 extends longitudinally of the bracket 44 and disposed centrally between the legs 46 and 48 thereof. The opposite ends of the screw shaft 62 are respectively journaled in the bight portion 42 of the bracket 44 and in the laterally extending portion 53 of the shield 52. A collar 64 is secured to the screw shaft 62 as by a pin 66 passing therethrough and through the shaft so that the collar will not rotate therewith, and the collar 64 is disposed immediately below the bight portion 42 to prevent longitudinal movement of the shaft 62 in one direction while a similar collar 68 is secured to the shaft 62 adjacent the upper surface of the laterally extending portion 53 of the shield 52 and secured thereon as by a pin, similar to the pin 66, and extending through the collar 64 of the shaft 62 so as to prevent the collar from movement longitudinally of the screw shaft 62. The collar 68 prevents longitudinal movement of the screw shaft in the other direction relative to the bracket 44.

A lower end 70 which extends through the portion 53 of the shield 52 and therebeyond has mounted thereon a pulley wheel 72 having the usual collar 74 which carries a set screw for securing the pulley wheel onto the shaft. The outer peripheral edge of the pulley wheel is preferably faced with rubber or some other comparable friction material and is disposed so as to rotate with the shaft 62 as it imparts rotation thereto and will be within the guides 55 and 57 defined by the depending flanges 54 and 56 and the inwardly directed ends or feet 58 and 60 respectively. Thus, a pulley belt 76 which is trained about the pulley wheel 72 is guided between the guides 55 and 57 so as to be maintained in contact with the pulley wheel 72 and be prevented from falling away from the pulley wheel.

The pulley belt 76 is also trained about the knurled portion of the chuck 22 of the drill 10 and the belt 76 may be adjusted in a taut condition by the movement of the collar 32 along the steadying handle 24 to a selected position and the collar 32 then secured on the steadying handle by tightening the set screw 34.

Thus, upon actuation of the drill 10 by action of the lever 16, rotation will be imparted to the chuck 22 which will drive the belt 76 and the pulley wheel 72 to thus impart rotation to the screw shaft 62.

An arm 78 is carried by the screw shaft 62 so as to extend normally therefrom to either side thereof through the space between the legs 46 and 48 of the bracket 44 since the arm 78 is carried intermediate its ends at a hub 80 formed at the midpoint location and having an internally threaded bore transversely therethrough which is in threaded engagement with the screw shaft 62. Thus, the arm 78 is carried by the screw shaft 62 for movement longitudinally thereof upon rotation of the shaft. The chain 82 has one end 84 secured to one free end 86 of the arm 78 while the other free end 87 of the arm 78 dependingly carries a hook 88 upon which the chain 82 may be releasably secured adjacent its other end 89. As clearly shown in Figures 1 and 3, the chain 82 is adapted to be trained about the workpiece 28 and have its free end releasably secured in the hook 88 on the arm 78 so that the arm 78 is in spaced parallel relation to the workpiece 28 and the chain having opposite ends thereof secured to the arm and trained about the workpiece.

It should be noted that the hub 80 has extending transversely thereacross a barrel 81 through which the shaft 62 passes so that the arm 78 is pivotally mounted at the midpoint location thereof.

A gripping handle 90 is carried by the bight portion 42 of the bracket 44 and extends outwardly therefrom and generally perpendicularly to the legs 46 and 48 thereof in a direction away from the body 12 of the drill 10 and in relatively close spaced relation with the steadying handle 24.

In operation, the drill 10 having a twist-type drill 26 secured in the chuck 22 thereof and being of the desired size or diameter, is placed upon the workpiece 28 through which one or more holes are to be drilled with the point of the drill 26 being in contact with the surface of the workpiece, and the chain 82 of the attachment 30 placed around the workpiece 28 in such manner as it fits snugly thereabout and is secured adjacent its end 89 from the hook 88 on the end 87 of the arm 78. The pulley belt 76 may then be adjusted, or may have previously been adjusted, so as to be taut between the pulley wheel 72 and the knurled portion of the chuck 22 by selectively adjusting the collar 32 upon the steadying handle 24. Thus, as the power drill 10 is actuated so as to cause rotation of the twist drill 26, the rotation of the chuck 22 will be transmitted through the pulley belt 76 to the wheel 72 and thence impart rotation to the screw shaft 62. As the screw shaft 62 rotated, the arm 78 to which the chain 82 is secured adjacent opposite ends will travel longitudinally of the shaft 62 in a direction toward the steadying handle 24 which will cause the chain 82 to pull the work against the rotating twist drill 26 and thus cause the twist drill 26 to feed into and through the work almost automatically since the rotational power of the drill 10 itself will cause the workpiece 28 to move against the rotating twist drill 26. One hand of the operator will grasp the steadying handle 24 and the handle 90 of the attachment 30 so as to maintain the pulley belt 76 in engagement between the pulley wheel 72 and the chuck 22, while the other hand of the operator may conveniently grasp the pistol-like type handle 14 with one finger on the actuating lever 16.

In order to reset the attachment 30 for further operation, it is merely necessary to depress the handle 90 from the solid line position shown in Figure 1 to the dotted line position shown therein so as to cause the bracket 44 to move in its arcuate path about the center line of the pivot pin or screw 50 as an axis and thereby cause the pulley wheel's periphery to contact the knurled portion of the chuck 22 whereupon rotation will be imparted to the pulley wheel 72 in a direction opposite to that which is imparted to the pulley wheel by its operative connection to the chuck 22 through the pulley belt 76. Upon the reverse rotation of the pulley wheel 72, rotation in the same direction will be imparted to the screw shaft 62 and thereby cause the arm 78 to move longitudinally of the shaft 62 in a direction toward the pulley 72 or away from the bight portion 42 and the collar 32. While the pulley wheel 72 is in direct contact with the chuck 22, the pulley belt 76 will be prevented from falling off the attachment 30 due to the construction of the guides 55 and 57 of the shield 52.

It will thus be apparent that with the arm 78 in a reset position, the drilling operation may be repeated, and if the drilling operation is to be performed repeatedly in the same workpiece 28, it will be unnecessary to unhook the chain 82 and readjust the same.

Since the arm 78 is pivotally mounted centrally intermediate its ends upon the barrel 81, the downward pressure of the chain 82, when the device is in operation, will tend to equalize the pressure on both sides of the hub and barrel of the arm 78 so that there is no binding on the threads of the screw shaft 62.

In Figure 6, there is shown the application of the attachment 30 to the workpiece 28 for use as a clamp. When used as a clamp, the collar 32 will be removed from the attachment by removal of the screw or pin 50 so that the outer surface of the bight portion 42 of the bracket 44 will be in contact with the upper surface of the workpiece 28 while the free end 91 of the gripping handle 90 will also be in contact with the upper surface of the workpiece 28 at a location spaced from the contact point of the bight 42 with the workpiece 28. The chain 82 will depend from opposite ends of the arm 78 and be trained about a second workpiece, not shown, and then hooked adjacent its ends 89 and the hook 88. Upon rotation of the pulley wheel 72, either manually or by suitable connection to a power means, the arm 78 will be caused to travel in its rectilinear path longitudinally of the screw shaft 62 since rotation of the pulley wheel 72 will impart rotation to the shaft 62, to thereby cause the chain 82 to tightly clamp about the workpiece 28 and when another, or plurality of, workpiece to which it is to be clamped.

From the foregoing, it will be apparent that there has been provided, in basic essence, an attachment for a power drill which has a steadying handle 24, the attachment 30 comprising a bracket 44 carried by the steadying handle in spaced relation to the drill 10, a screw shaft 62 rotatably carried by the bracket 44, means defined by the pulley wheel 72 carried by the shaft at one end thereof and operatively connected to the drill chuck 22 by means of the pulley belt 76 to impart rotation to the shaft 62, means defined by the arm 78 carried by the shaft 62 for movement in a rectilinear path longitudinally thereof upon rotation of the shaft and adapted for attachment, by means of the chain 82, to a workpiece 28 to be drilled, the rotation of the shaft 62 upon operation of the drill 10 causing the means carried by the shaft to move longitudinally thereof in a direction away from the workpiece 28 to feed the drill 26 into the workpiece 28.

Also, it will be apparent that the bracket 44 is carried by the steadying handle 24 for movement in an arcuate path toward and away from the drill 10 with the bracket 44 carrying a gripping handle 90 which extends outwardly therefrom in spaced relation to the steadying handle 24 and disposed therebeneath, as viewed in Figure 1, the gripping handle 90 being effective to move the bracket 44 in its arcuate path toward the drill 10 whereby the pulley wheel 72 will directly contact the drill chuck 22 and have rotation imparted thereto in a direction opposite to the direction of rotation imparted thereto by the means operatively connecting the pulley wheel to the drill chuck, and thereby cause the arm 78 to move longitudinally of the screw shaft 62 in a direction toward the workpiece to permit resetting of the attachment in relation to the drill 10 and the workpiece 28.

While there are shown and described the preferred embodiment of the invention, it is to be understood that the structure is susceptible to change and modification within the practicability of the invention and therefore should be limited only by the scope of the claims appended hereto.

What is claimed is:

1. An attachment for a power drill having a steadying handle, comprising a U-shaped bracket dependingly carried by the steadying handle in spaced relation to the drill, a rotatable screw shaft carried by the bracket disposed between the legs thereof, means carried by said shaft at its lower end and operatively connected to the chuck of said drill to impart rotation to said shaft, an arm pivotally carried intermediate its ends upon said shaft and disposed normally thereto for movement longitudinally thereof, said arm extending outwardly from either side of said bracket between said legs, and means carried by said arm for attachment about a workpiece to be drilled, rotation of said shaft upon operation of the drill causing said arm to move in a direction away from said workpiece to feed said drill into the workpiece.

2. An attachment for a power drill having a steadying handle, comprising a collar carried by said steadying handle, a bracket arranged in spaced relation to the drill and carried by said collar for movement in an arcuate path toward and away from said drill, a screw shaft rotatably carried by said bracket, means carried by said shaft operatively connected to the drill chuck upon movement of said bracket in its arcuate path toward said drill to impart rotation to said shaft, means carried by said shaft for movement longitudinally thereof upon rotation of the shaft and adapted for attachment to a workpiece to be drilled, rotation of said shaft upon operation of the drill causing said last-mentioned means to move longitudinally of said shaft in a direction away from the workpiece to feed the drill into the workpiece.

3. An attachment for a power drill having a steadying handle, comprising a bracket carried by said steadying handle in spaced relation to said drill for movement in an arcuate path toward and away from said drill, a screw shaft rotatably carried by and extending longitudinally of said bracket, a pulley wheel carried by said shaft at one end thereof and operatively connected to the drill chuck for imparting rotation thereto and to said shaft in one direction, means carried by said shaft for movement longitudinally thereof upon rotation of said shaft and adapted for attachment to a workpiece to be drilled, a gripping handle carried by said bracket extending outwardly therefrom in spaced relation to said steadying handle, rotation of said shaft upon operation of said drill causing said means to move longitudinally of said shaft in said one direction away from the workpiece to feed the drill into the workpiece, said gripping handle effective to move said bracket in its arcuate path toward said drill whereby said wheel will directly contact the drill chuck and have rotation imparted thereto in a direction opposite to said one direction to cause said means to move longitudinally of said shaft in a direction toward the workpiece.

4. An attachment for a power drill having a steadying handle, comprising a bracket carried by said steadying handle in spaced relation to said drill for movement in an arcuate path toward and away from said drill, a screw shaft rotatably carried by and extending longitudinally of said bracket, a pulley wheel carried by said shaft at one end thereof and operatively connected to the drill chuck for imparting rotation thereto and to said shaft in one direction, means carried by said shaft for movement longitudinally thereof upon rotation of said shaft and adapted for attachment to a workpiece to be drilled, a gripping handle carried by said bracket extending outwardly therefrom in spaced relation to said steadying handle, rotation of said shaft upon operation of said drill causing said means to move longitudinally of said shaft in said one direction away from the workpiece to feed the drill into the workpiece, said gripping handle effective to move said bracket in its arcuate path toward said drill whereby said wheel will directly contact the drill chuck and have rotation imparted thereto in a direction opposite to said one direction to cause said means to move longitudinally of said shaft in a direction toward the workpiece, a collar carried by said steadying handle for movement longitudinally thereof, said bracket carried by said collar, means on said collar for securing it on said steadying handle at a selected location therealong to space said bracket from the drill at a selective distance therefrom.

References Cited in the file of this patent
UNITED STATES PATENTS

| | | |
|---|---|---|
| 760,525 | Crossman | May 24, 1904 |
| 1,416,777 | Bayrer | May 23, 1922 |
| 1,813,785 | Weber | July 7, 1931 |
| 2,362,929 | Richards | Nov. 14, 1944 |